United States Patent [19]

Dalton

[11] 4,332,223

[45] Jun. 1, 1982

[54] PLASMA FUEL IGNITORS

[76] Inventor: James M. Dalton, 253 Elm St., Salt Lake City, Utah 84107

[21] Appl. No.: 182,687

[22] Filed: Aug. 29, 1980

[51] Int. Cl.³ .................. F02B 19/10; F02P 23/00; F02B 23/00
[52] U.S. Cl. ............................ 123/253; 123/254; 123/266; 123/DIG. 1; 123/DIG. 7; 123/143 B; 123/41.32
[58] Field of Search ......... 123/253, 254, 266, DIG. 1, 123/DIG. 7, 184, 143 R, 144, 267, 274, 143 B, 41-32

[56] References Cited

U.S. PATENT DOCUMENTS

| 2,581,458 | 6/1952 | Thompson | 123/266 |
|---|---|---|---|
| 2,826,187 | 3/1958 | Meyer | 123/266 |
| 3,058,452 | 10/1962 | Espenschied | 123/254 |
| 3,502,055 | 3/1970 | Boesch | 123/143 |
| 3,921,605 | 11/1975 | Wyczalok | 123/143 B |
| 4,096,832 | 6/1978 | Caroll et al. | 123/41.32 |
| 4,265,201 | 5/1981 | Gerry | 123/266 |

Primary Examiner—Raymond A. Nelli

Attorney, Agent, or Firm—Thorpe, North & Western

[57] ABSTRACT

An improved ignitor and ignition method for igniting a wide variety of fuels that may be used to power various types of engines, or for use with other applications requiring the efficient combustion of fuel. The fuel to be burned is mixed with air to form a relatively lean first fuel/air mixture. This first fuel/air mixture is then injected into the primary combustion chamber, such as the combustion zone of a cylinder of an internal combustion engine, or similar combustion chamber of other types of fuel-burning apparatus. The first fuel/air mixture is ignited with a stream of hot ionized gas that is jetted into the primary combustion chamber from a precombustion or plasma-generating chamber. The plasma-generating chamber is in close proximity to the primary combustion chamber, with a plasma guide or discharge tunnel connecting the two. A fuel line connects a source of pressurized fuel to the plasma-generating chamber. Interposed in this fuel line are a backflow restrictor and a fuel vaporizor, thereby ensuring that only vaporized fuel passes into (and not out of) the plasma-generating chamber through the fuel line.

20 Claims, 7 Drawing Figures

PLASMA FUEL IGNITORS

BACKGROUND OF THE INVENTION

This invention relates to an ignition apparatus and method for igniting relatively lean fuel/air mixtures in a primary combustion chamber. More particularly, the invention relates in one embodiment of the invention, to an ignition apparatus that may be retrofitted into a conventional internal combustion engine, whether gas, diesel, or the like, to significantly improve the amount of energy that can be extracted from a fixed unit of fuel.

A common problem associated with any system that relies upon the burning of fuel as a source of energy is efficiently igniting the fuel so that a maximum amount of energy can be derived therefrom. This is especially a problem in an internal combustion engine (and similar applications), where the fuel must be rapidly burned so as to transfer maximum energy to the piston. For this reason, careful selection and maintenance of the fuel/air ratio and the octane rating of the particular fuel that is used are extremely important considerations for the efficient performance of a conventional spark-ignition internal combustion engine. Likewise, the cetane rating of diesel fuel becomes a very important factor for efficient performance of a conventional diesel engine.

It is commonly known that no more heat energy can be derived from a high-octane or high-cetane fuel than can be derived from a low-octane or low-cetane fuel. This is because octane and cetane merely refer to a measure of the auto-ignition characteristics of the gasoline or diesel fuel respectively. Thus, a low-octane (or low-cetane) fuel is simply more difficult to ignite than a high-octane (or high-cetane) fuel. The use of a low-octane fuel in a spark ignition engine, for example, may result in "knocking," which simply means that some of the highly compressed fuel in the cylinder (which should have been ignited but for the poor auto-ignition characteristics of the fuel) is compressed even more by the flame front moving out from the spark plug. As this compressed fuel continues to be compressed against the walls of the combustion chamber, or other similar combustion chamber, it acts as a hot moving piston that "knocks" against the combustion chamber wall. Such knocking, commonly referred to as detonation, is not only inefficient (because not all of the fuel in the cylinder is being burned) but it can also inflict serious damage to the engine. A similar problem to "knocking" occurs when a low-cetane fuel is ignited in a diesel engine, the low cetane rating delaying the time at which the fuel ignites and thereby producing combustion pressures not synchronized nor compatible with optimum performance of the engine. Unfortunately, as is well known, the refining of high-octane and high-cetane fuels is more costly and not as efficient (that is, there are not as many gallons that can be refined from a given amount of crude oil) as the refining of low-octane or low-cetane fuels. Thus, the use of high-octane and high-cetane fuels by most modern internal combustion engines presents some "built-in" innefficiencies relative to the ever decreasing supply of available crude oil.

An additional problem associated with the operation of conventional spark-ignition internal combustion engines is maintaining the correct fuel/air ratio to insure the efficient ignition of the fuel. This is because the relatively low ignition efficiency of a conventional spark plug requires a relatively rich fuel/air mixture in order to sustain ignition. Accordingly, it is customary to provide an excess of fuel solely for ignition purposes. A typical fuel/air ratio, for example, may be about 1:8 (1 part vaporized fuel to 8 parts air). However, this fuel/air ratio is substantially in excess of an optimum fuel/air ratio for the appropriate combustion and expansion of the combustion products in the cylinder. It is currently believed that an optimum fuel/air ratio for combustion may be as low as 1:40. Thus, the use of a fuel/air ratio for ignition purposes that contains 4 or 5 times as much fuel is as really needed for optimum combustion is terribly inefficient.

While there have been some prior art attempts to improve the inefficiencies caused by the relatively rich fuel/air ratios required by conventional spark-ignition engines, such as that disclosed in U.S. Pat. No. 4,096,832 (1978) (wherein this inventor was a joint inventor), including the "stratified charge" systems described in that patent, there has been little disclosed in the prior art of which this inventor is aware to improve the "built-in" inefficiencies that result from having to use high-octane and high-cetane fuels. Moreover, the continued use of conventional gasoline and diesel fuel may in itself be somewhat of a "built-in" inefficiency for the operation of most hydrocarbon powered engines. This is because many other fuel types may be more readily available or produceable, or could be more efficiently refined from the same amount of crude oil, than the ubiquitous gasoline and diesel fuels. Such other fuels would include alcohol, kerosene, coal oil, hydrogen, methane, and producer gas.

It would, therefore, be an improvement in the art to provide a fuel ignitor that would not only efficiently ignite a lean fuel/air mixture, but that would also be useable with lower-octane and cetane fuels, or other types of fuels that are more readily available and less expensive to produce. It would be a further improvement in the art if such a fuel ignitor could not only be retrofitted into an existing gasoline or diesel engines, but also useable for a wide variety of applications that require the efficient combustion of a fuel contained in a primary combustion chamber. Such an invention is disclosed and claimed herein.

SUMMARY OF THE INVENTION

A first object of the present invention is to provide a fuel ignitor that can be used to efficiently ignite low-octane or low-cetane fuels without the occurance of detonation or similar undesirable and inefficient knocking, thereby allowing these more efficiently produced fuels to be readily used.

A second object of the present invention is to provide such an ignitor that will readily ignite a lean fuel/air mixture, thereby allowing a given amount of fuel to be more efficiently used.

A third object of the present invention is to provide such a ignitor that can be used to ignite a wide variety of hydrocarbon and other types of fuels, thereby adding greater flexibility to the design and operation of whatever fuel-consuming apparatus is used.

A fourth object of the present invention, in accordance with one embodiment thereof, is to provide a fuel ignitor meeting the above objectives that may be easily retrofitted into a conventional spark-ignition or diesel internal combustion engine, thereby allowing the more efficient operation of such an engine through the use of less expensive, lower octane, lower cetane, or other more efficiently produced fuels, at relatively lower (leaner) fuel/air ratios.

A fifth object of the present invention is to provide an ignition apparatus of the type above described that is relatively inexpensive to produce and easy to install, maintain, and operate, thereby encouraging its use among a wide variety of fuel consumers.

The above and other objects of the present invention are realized in an illustrative embodiment that includes a primary combustion chamber into which a relatively lean fuel/air mixture has been inserted. This primary combustion chamber may be, for example, the cylinder of an internal combustion engine. A "plasma-generating chamber" is coupled to the primary combustion chamber by means of a discharge tunnel or "plasma guide." A pressurized fuel source connected to the plasma-generating chamber by a fuel line has interposed therein a back flow restrictor which opposes reverse flow action of the fuel therethrough and which further allows the fuel to seep forwardly therethrough at a rate that is generally proportional to the pressure imposed on the fuel. Downstream from the back flow restrictor, and still interposed in the fuel line, is a vaporizing unit that vaporizes the fuel prior to its entrance into the plasma-generating chamber. A porous plug may be used in the fuel line immediately prior to its termination at the plasma-generating chamber to insure that only vaporized fuel is allowed to pass thereinto. Also, vapor inhibiting means may be used upstream from the vaporizing unit to maintain the fuel in its liquid state within the fuel line system until the vaporizing unit is reached.

The plasma-generating chamber also contains a means of discharging, in a timed and controlled sequence, an electronic discharge therewithin.

In operation, fuel from the pressurized fuel source flows through the fuel line into the plasma-generating chamber. By the time the fuel reaches the plasma-generating chamber it is a completely vaporized gas. With a high temperature surrounding the plasma-generating chamber, an electronic discharge is released therewithin by the electronic discharge means. In the preferred embodiment and mode of operation, this electronic discharge does not ignite the hot vaporized gas within the plasma-generating chamber. Rather, it ionizes this hot gas, thereby forming a hot ionized gas which may be referred to as "plasma." Added energy is required to convert the hot vaporized gas into the plasma. This added energy greatly excites the plasma and causes it to rapidly expand. As it expands, it exits from the plasma-generating chamber through the discharge tunnel or "plasma guide" into the primary combustion chamber.

Prior to entering the primary combustion chamber, the hot ionized gas, or plasma, passes through a specially adapted nozzle at the end of the plasma guide. This nozzle includes at least one step increase in orifice size. The effect of the nozzle is to cause the plasma to be maintained in a narrow stream as it flows into the primary combustion chamber. After the plasma has passed through the nozzle, it spreads out and dissipates throughout the primary combustion chamber. Because the temperature of the plasma is very high, it readily ignites the lean fuel/air mixture contained in the primary combustion chamber.

Typically, the walls of the plasma-generating chamber, as well as the walls of the plasma guide and nozzle, are made of a conductive material which is maintained at a specified voltage potential. The plasma, being ionized, also assumes an electric polarity. By properly selecting the electric potential of the walls of the plasma-generating chamber, plasma guide, and nozzle, the plasma is electrically repelled away from these walls to the respective centers of the plasma-generating chamber, discharge tunnel, and nozzle. Thus, the hot plasma does not physically come in contact with these walls, which physical contact not only would represent a serious loss of heat to the plasma, but could also present a serious threat of heat damage to the walls themselves.

For some applications, it may be desirable to mix oxygen (or air) with the pressurized fuel prior to vaporizing the fuel and introducing it into the plasma-generating chamber. However, for the most part, very little, if any, oxygen is mixed with the vaporized fuel in the plasma-generating chamber to prevent combustion from occuring therewithin. Rather, the hot vaporized gas is predominantly ionized, not ignited, while in the plasma-generating chamber. Once ionized, it assumes a very high temperature which is transferred to the primary combustion chamber through the plasma wave front that is jetted thereinto through the plasma guide and nozzle.

BRIEF DESCRIPTION OF THE DRAWINGS

The above and other objects, features, and advantages of the invention will be more apparent from the following more particular description presented in connection with the accompanying drawings in which.

DESCRIPTION OF THE PREFERRED EMBODIMENTS

The invention disclosed herein is in some aspects an improvement to that disclosed in U.S. Pat. No. 4,096,832 in which this inventor was a joint inventor. However, other aspects of this invention represent radical and significant changes to that disclosed in the above referred to patent; and, as such, embody revolutionary new concepts relating to fuel ignition.

The invention will be best understood by reference to the figures wherein like parts, wherever feasible, are designated with like numerals throughout.

Figure 1:
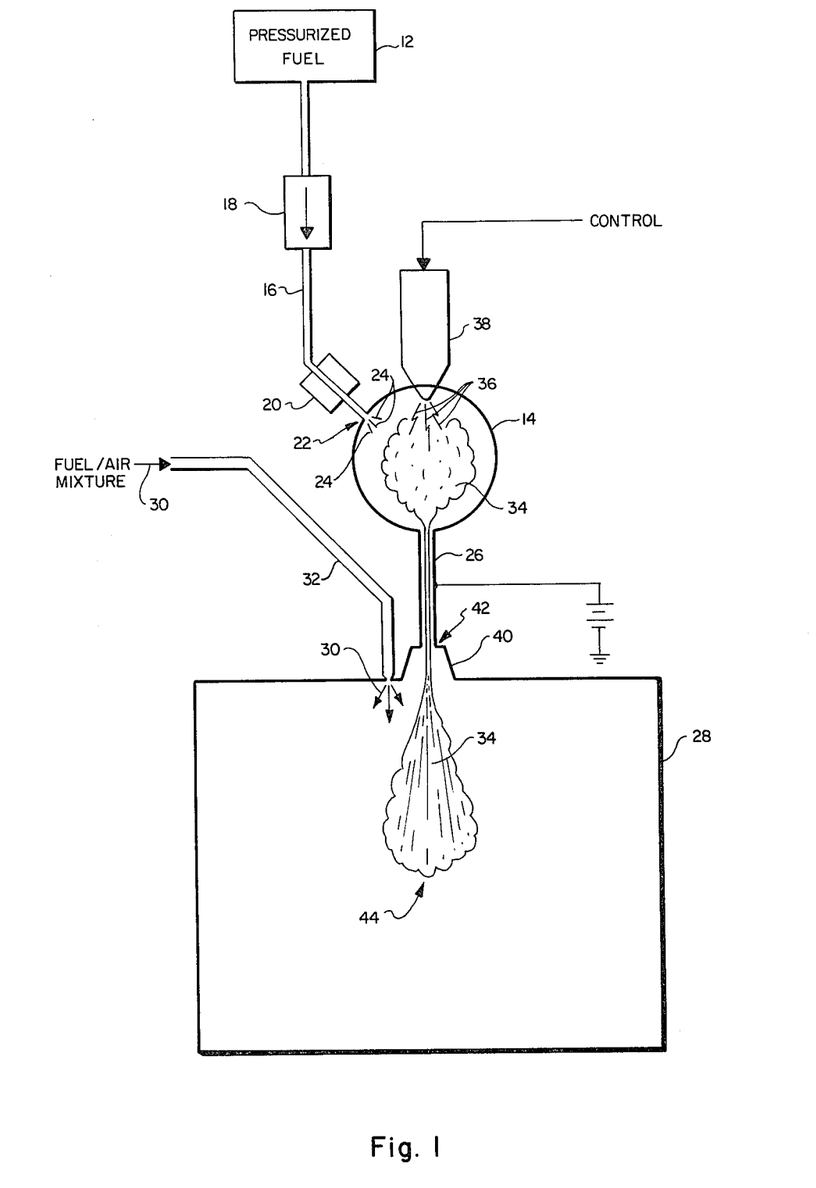
FIG. 1 is a simplified block diagram of the invention.

Referring first to FIG. 1, the present invention includes a source of pressurized fuel 12 that is connected to a plasma-generating chamber 14 via a fuel line 16. Interposed in the fuel line 16 is a backflow restrictor 18. This backflow restrictor 18 is responsible for insuring that the fuel passes only one way therethrough. Furthermore, the backflow restrictor 18 is adapted to allow fuel from the pressurized fuel source 12 to pass forwardly therethrough at a rate proportional to the pressure of the fuel. A vaporizing unit 20 surrounds the fuel line 16 at a point immediately prior to the termination of the fuel line 16 at the plasma-generating chamber 14.

Typically, the fuel line 16 opens up into the plasma-generating chamber 14 along one side thereof as shown generally at 22. The vaporized fuel, symbolically represented by the radial lines 24, is thus allowed to enter and fill the plasma-generating chamber 14.

A discharge tunnel or "plasma guide" 26 connects the plasma-generating chamber 14 to a primary combustion chamber 28. It is in the primary combustion chamber 28 that a desired fuel/air mixture 30 is ignited and consumed. The fuel/air mixture 30 typically enters the primary combustion chamber by means of a second independent fuel line 32. This fuel/air mixture 30 will typically be a relatively lean mixture (that is, there will be one part of fuel for many parts of air, such as one part fuel to 30–50 parts of air) in order to optimally use the amount of fuel that is available. In practice, the actual fuel/air ratio will be dependent upon the power requirements of the particular apparatus that is consuming the fuel. However, as mentioned above, suitable amounts of energy can be extracted from a lean fuel/air mixture providing the mixture can be properly ignited. It is, of course, a primary purpose of the invention disclosed herein to provide an apparatus and method capable of igniting such a lean fuel/air mixture.

The vehicle contemplated by the preferred embodiment of the present invention for igniting the lean fuel/air mixture 30 contained in the primary combustion chamber 28 is a hot ionized gas or plasma 34. This hot ionized gas or plasma 34 is formed in the plasma-generating chamber 14 by exposing the vaporized fuel 24 therein to a high electrical discharge. This high electric discharge, represented symbolically in FIG. 1 as the lightning shaped lines 36, originates from a discharge unit 38. The discharge 36 strips or adds some electrons from the molecules and atoms of the vaporized fuel 24, thereby "ionizing" the vaporized fuel. As it is ionized, or "plasmatized," it undergoes temendous heat expansion. This heat expansion, coupled with induced electrical force fields, discussed below, serve as sources of energy that force the newly formed plasma from the plasma-generating chamber 14 through the plasma guide 26 into the primary combustion chamber 28.

At the termination of the plasma guide 26 immediately prior to its entering the primary combustion chamber 28 is a specially configured nozzle 40. This nozzle is configured to have a cross sectional appearance as shown generally in FIG. 1. That is, a step increase in the size of the orifice at the end of the plasma guide 26 occurs at 42. After this step in orifice size, the size of the orifice linearly increases until the boundary of the primary combustion chamber 28 is reached. As thus described, the nozzle 40 has a cross-section shaped much like a conical frustum having its base coincident with the boundary of the primary combustion chamber 28.

The above described configuration of the nozzle 40 is important in order to impart a desired directivity to the plasma 34 as it is jetted into the primary combustion chamber 28. When the plasma 34 is ionized, it has associated therewith an electrical charge. By charging the walls of the plasma-generating chamber 14, the plasma guide 26, and the nozzle 40 with a like electrical charge, (through the use of a suitable electric potential connected thereto) electrical forces will be generated that repel the ionized plasma 34 to the respective centers of these elements. Thus, as illustrated symbolically in FIG. 1, the plasma 34 does not physically touch the inside walls of the plasma-generating chamber 14, the plasma guide 26, or the nozzle 40. By maintaining the plasma 34 away from these interior walls in this fashion, the very high temperatures associated with the plasma are more easily maintained. Moreover, by configuring the nozzle 40 with a frustum-like shape as shown in FIG. 1, the plasma 34 will pass into the primary combustion chamber 28 with a desired directivity. That is, as the plasma 34 passes through the step increase in orifice size at 42, it will be maintained in a relatively narrow stream. However, as the orifice size of the nozzle 40 linearly increases, the plasma 34 will begin to spread out and disperse into all areas of the primary combustion chamber 28 as shown at 44.

As the hot ionized gas or plasma 34 spreads throughout the primary combustion chamber 28, it comes in contact with the lean fuel/air mixture therein and causes it to ignite. Because the ignition of this lean fuel/air mixture may begin simultaneously at several random locations throughout the primary combustion chamber 28, the propogation of undesirable flame fronts (which are normally associated with the igniting of a fuel/air mixture at one point) are kept to a minimum. Thus, the occurrence of detonation (or an equivalent undesirable knocking phenomenon) is eliminated, thereby allowing low octane and/or low cetane fuels, or their equivalent, to be employed.

The discharge unit 38 is controlled in cyclic fashion similar to the cyclic manner in which a spark plug is controlled in a conventional spark-ignition system or a fuel-injector is controlled in a conventional diesel engine. Thus, the blast of plasma 34 into the primary combustion chamber 28 may be selectively timed so that the maximum benefit may be derived from the energy released when the lean fuel/air mixture is ignited.

As the plasma 34 ignites the relatively lean fuel/air mixture in the primary combustion chamber 28, it not only ignites it, but the plasma may also initiate a controlled chain reaction in which more plasma is created within the primary combustion chamber 28 from portions of the lean fuel/air mixture contained therein. The amount of additional plasma thus formed appears to be a function of the amount of plasma jetted thereinto from the plasma-generating chamber 14. Hence, the invention may function, at least to a limited extent, as a plasma amplifier wherein a small amount of plasma (formed in the plasma-generating chamber 14) may be used to generate and control a larger amount of plasma (formed in the primary combustion chamber 28).

In connection with the above-described "amplification" of the plasma, an interesting phenomenon occurs when the walls of the primary combustion chamber 28 are also charged with an appropriate electrical potential so as to repel the plasma away therefrom. The exterior boundary layer of what plasma exists in the primary combustion chamber rapidly expands and contracts in elastic-like fashion as the lean fuel/air mixture is ignited in a timed sequence. If the plasma 34 is jetted into the primary combustion chamber 28 at a proper angle, the body of plasma maintained therein may have a circular or rotational motion imparted to it in addition to the pulsating (expanding-contracting) motion described above. A rotating electric or magnetic field could be employed, if desired, to help maintain the rotational momentum of the plasma. This rotational motion of the plasma represents an additional form of energy within the primary combustion chamber—much like a flywheel—that may be extracted in appropriate devices so as to improve the overall efficiency of the device. In particular, jet engines, turbines, and similar engines employing rotating members could easily be adpated to tap this form of rotational energy. Because the pulsating energy would also be available, it is believed by the inventor that some very efficient engines could thus result. Moreover, electromagnetic mirroring could also be used to vastly improve the overall efficiency of the engine.

Figure 2:
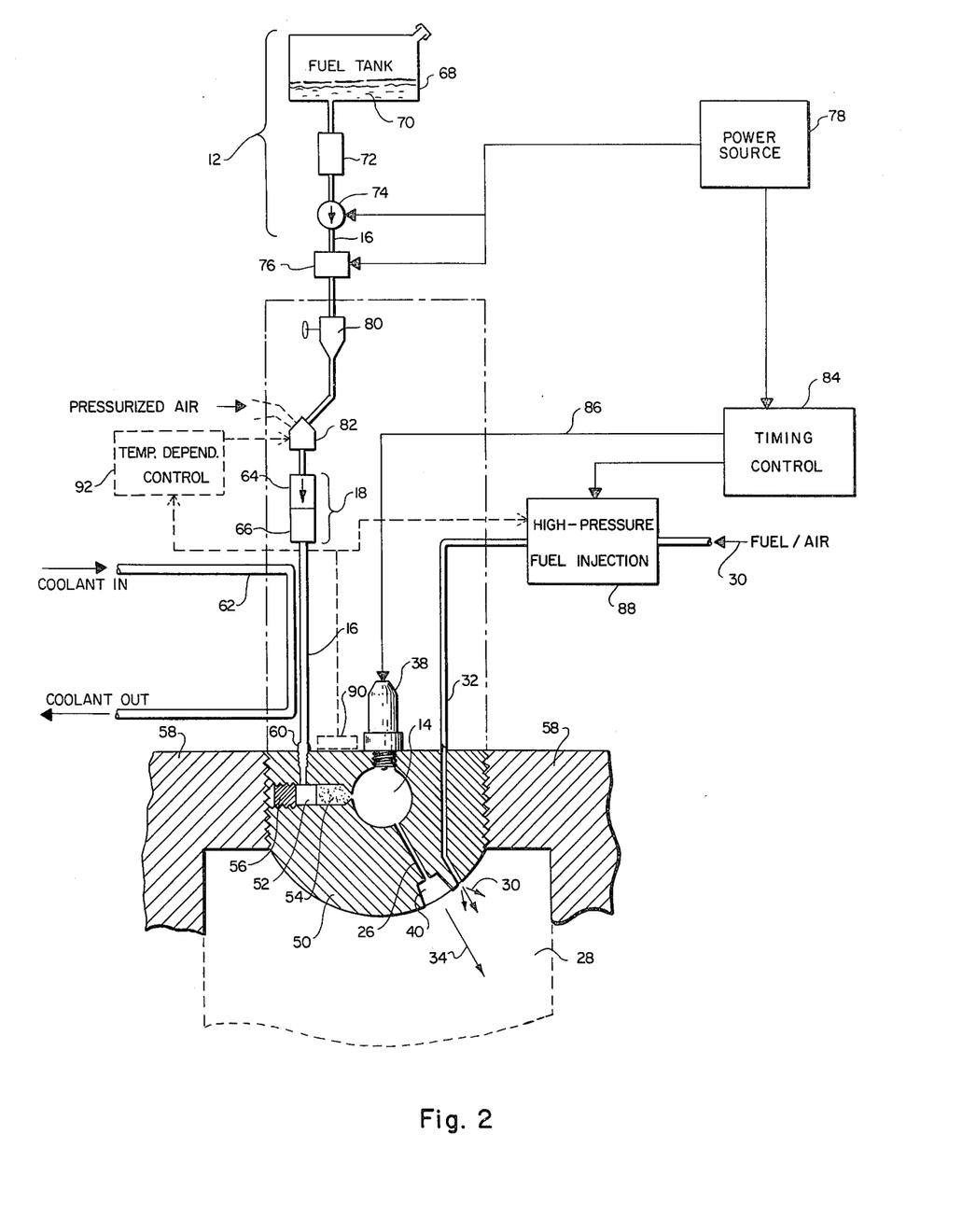
FIG. 2 is a more detailed block diagram of the invention, teaching the flow sequence of how the invention could be implemented with a conventional internal combustion engine.

In FIG. 2, a more detailed diagram is presented depicting how the invention could be employed with a conventional internal combustion engine. In this embodiment, the plasma—generating chamber 14 is machined (or otherwise placed inside of) a plug 50 that is adapted to be removably inserted into the spark plug or fuel injector opening. The plasma guide 26 and the nozzle 40 are likewise machined (or otherwise disposed within) this same plug 50. The primary combustion chamber 28 comprises the cylinder of the internal combustion engine corresponding to the spark plug or fuel injector opening into which the plug 50 is inserted.

Both the fuel line 16 and the discharge unit 38 are threadedly inserted into the plug 50, the discharge unit 38 extending into the periphery of the plasma-generating chamber 14, and the fuel line 16 extending into a transverse channel 52. This transverse channel 52 has a significantly larger cross-sectional diameter than the fuel line 16. As indicated in FIG. 2, the transverse channel 52 extends from one edge of the plug 50 all the way to the plasma-generating chamber 14. A porous plug 54 is inserted into the channel 52 so as to be immediately adjacent to the plasma-generating chamber 14. An end cap or plug 56 is screwed into the channel 52 in order to close off the outside end thereof. Using an end cap 56 in this fashion facilitates the insertion of the porous plug 54 into the channel 52.

The function of the porous plug 54 is to allow only vaporized fuel to pass into the plasma-generating chamber 14. The vaporizing unit 20 referred to in FIG. 1 actually comprises all of the metal (or other thermal conductive material) that surrounds the path of fluid flow as it passes through the plug 50. Heat is transferred to the plug 50, as well as to the engine block 58 into which the plug 50 is inserted, by the combustion process that takes place within the cylinder (or primary combustion chamber 28). This heat not only serves to vaporize the fuel as it passes into the transverse channel 52, but it also serves to raise the temperature of the plasma-generating chamber 14 to the levels required in order to aid in the formation of the ionized gas or plasma 34. Stiffening material 60 is typically used at the point where the fuel line 16 is threaded into the plug 50 in order to maintain the fuel line 16 in a mechanically secure position. Moreover, the stiffening material 60 also acts as a thermal conductor to aid in the vaporizing process.

In the preferred embodiment, some sort of vapor inhibiting means is typically required upstream from those portions of the fuel line 16 where vaporization occurs. This is necessary in order to inhibit vapor lock that might otherwise occur if the fuel is prematurely vaporized. A typical method for inhibiting premature vaporization comprises placing a coolant line or tube 62 in close proximity with the fuel line 16. A suitable coolant is then allowed to cycle through the line or tube 62, thereby removing excess heat from the fuel line 16 which might otherwise cause the fuel to prematurely vaporize.

Upstream from the cooling line 62 is the backflow restrictor 18. In the preferred embodiment, this backflow restrictor 18 comprises a first section 64 and a second section 66. The first section 64 acts as a one-way flow device allowing the fuel to more easily pass therethrough only in the direction of the arrow indicated. The second section 66 contains a porous material under mechanical pressure. The porous material is selected so that when under compression it allows fuel to pass therethrough at a rate proportional to the pressure imposed on the fuel.

The pressurized fuel source 12 typically includes a fuel tank 68 into which a supply of fuel 70 has been inserted. The fuel 70 may be any of a wide variety of kinds of fuel, such as diesel fuel, gasoline, kerosene, alcohol, or other suitable fuels. A fuel filter 72 insures that all the fuel leaving the fuel tank 68 is free of debris and other undesirable foreign matter. A fuel pump 74 then serves to pressurize the fuel and force it through the fuel line 16 to the plasma-generating chamber 14. A pressure switch 76 may also be employed downstream from the fuel pump 74 so as to maintain the fuel 70 at a substantially constant pressure. Both the fuel pump 74 and the pressure switch 76 may be powered from a conventional power source 78, such as an electric battery or generator.

A needle valve 80 may also be required in the fuel line 16 in order to add additional control over the amount of fuel that is allowed to pass through the fuel line 16. In some embodiments of the invention, as will be more fully explained below, it may also be desirable to include an air inlet device 82 adapted to allow pressurized air to be mixed with the fuel in the line 16.

The discharge unit 38 is electrically coupled to a timing control unit 84 via a suitable cable or connector 86. The timing control unit 84 also may control a high pressure fuel injector device adapted to inject the relatively lean fuel/air mixture 30 into the primary combustion chamber 28 via the main fuel line 32. Thus, the timing control unit 84 can cause the plasma 34 to be formed and jetted into the primary combustion chamber 28 or cylinder at a time coincident with a burst of lean fuel/air mixture therein. In practice, it will take a few milliseconds from the time the discharge unit 38 is energized until the plasma 34 arrives in the primary combustion chamber 28. Accordingly, the timing control unit 84 can be designed so as to cause the fuel air mixture 30 to arrive in the primary combustion chamber 28 at an optimum time relative to the arrival of plasma therein. Alternatively, the capacitive or inductive reactance of the plasma-generating chamber 14 could be monitored to control the appropriate firing time. In connection with these timing considerations the inventor herein has determined that the lean fuel/air mixture 30 is more efficiently ignited when the primary fuel line 32 is routed so as to enter the primary combustion chamber 28 at an angle that is substantially parallel to that at which the discharge tunnel 26, including the nozzle 40, enters therein. Hence, by including a portion of the primary fuel line 32 as an integral part of the plug 50, as shown in FIG. 2, it is possible to realize a configuration wherein the lean fuel/air mixture 30 is pumped into the primary combustion chamber 28 substantially adjacent to and parallel with the plasma 34.

When the invention disclosed herein is used with a conventional internal combustion engine in the manner depicted in FIG. 2, some special problems are encountered during start-up when the engine is cold. This is because when the engine is cold there is little, if any, fuel vapor that is allowed to pass through the porous plug 54 into the plasma-generating chamber 14 because it is the heat from the engine that is relied upon in order to vaporize the fuel and to aid in the formation of the hot ionized gas or plasma 34. There are at least three solutions that can be used to overcome this problem. First, the material of the porous plug 54 can be selected so that when cold it will allow some fuel to pass therethrough. With this fuel in the plasma-generating chamber 14, the electric discharge from the discharge unit 38 will ignite the fuel as in a conventional spark-ignition system providing there is sufficient oxygen or air mixed therewith. Once ignited, a flame front is created which can pass through the discharge tunnel or plasma guide 26 and nozzle 40 into the cylinder or primary combustion chamber 28 in a manner similar to that described in U.S. Pat. No. 4,096,832. Thus, in this first solution, the air inlet 82 may be used to allow air to be mixed with the fuel when the engine is cold and just starting. A temperature sensor 90 (shown in dotted lines) coupled to a temperature dependent control 92 could also be utilized to sense when the temperature has increased to a sufficiently high level to permit normal operation of the plasma ignitor as described above. When a suitable temperature is reached, for example, the temperature dependent control 92 could thus be used to close the air inlet 82, thereby precluding ignition from taking place within the plasma-generating chamber 14 and allowing the formation of plasma to occur therewith.

As a second alternative to aid in the start-up of a cold engine, it should be recognized that the plasma-generating chamber 14 is in direct communication with the primary combustion chamber 28 through the discharge tunnel or plasma guide 26. Therefore, a portion of the fuel/air mixture that is pumped into the primary combustion chamber 28 via the primary fuel line 32 may pass backwards through the plasma guide 26 into the plasma-generating chamber 14. An electrical or electronic discharge from the discharge unit 38 could then ignite this fuel/air mixture and cause a flame front to jet into the primary combustion chamber 28, which flame front could ignite the remaining fuel/air mixture therein. If this alternative is used, it may be necessary to enrich the fuel/air mixture somewhat during start up. This could easily by accomplished with the fuel injection device 88, designing it so that a large amount of fuel is metered into the primary combustion chamber when the temperature sensor 90 senses that the engine is cold. As the temperature of the engine rises, the amount of fuel allowed to mix with the air could be significantly cut back, thereby achieving the benefits of using the leaner fuel/air mixture.

A third alternative to aid in the start-up of a cold engine is to employ a sampling tunnel, as is more particularly described below in connection with FIG. 3. For purposes of start-up, the sampling tunnel serves the same function as above described in connection with the plasma guide 26. That is, some of the fuel/air mixture in the primary combustion chamber 28 is allowed to pass back into the plasma-generating chamber 14 therethrough.

As an added benefit derived from the invention, it should be noted that the above described second and third methods for aiding the starting of a cold engine is inherent in the system as a failsafe mechanism should the fuel line 16 ever become clogged or stopped up. That is, even with a hot engine, some of the lean fuel/air mixture in the primary combustion chamber 28 may pass backwards through the plasma guide 26 (or sampling tunnel, if one is used) into the plasma-generating chamber 14. Assuming that the electrical discharge from the discharge unit 38 is sufficient to ignite this lean fuel/air mixture, which it typically will be, then a flame front will be created which may serve as a torch to ignite the remaining fuel/air mixture in the primary combustion 28 in accordance with the principles taught in U.S. Pat. No. 4,096,832. While this mode of operation is not very efficient, and detonation could easily occur in connection therewith, it nonetheless could allow the engine to operate until such time as the fuel line 16 could be unstopped.

In light of the above discussion, it should be emphasized that the preferred mode of operation of the invention described herein is that of forming plasma in the plasma-generating chamber 14 which is jetted into the primary combustion chamber 28 so as to ignite the lean fuel/air mixture 30 therein. The primary mechanism used to insure that plasma is formed in the plasma-generating chamber 14, rather than allowing the fuel to be ignited therein, is to not allow a sufficient quantity of oxygen to be mixed with the fuel therewithin. However, as explained above, it may be necessary to allow some ignition to occur in the plasma-generating chamber at some times or for some applications, such as during start up. Further, it is recognized that some oxygen will pass into the plasma-generating chamber 14 through the plasma guide 26. Accordingly, under certain conditions, it is apparent that at least some of the vaporized fuel within the plasma-generating chamber 14 may be ignited rather than converted into the desired plasma.

The dividing line between the formation of plasma and the ignition of the hot vaporized fuel is not a clear line. In fact, the very existance o plasma, including its use as an igniting medium, has only recently been recognized by scholars and scientists, although this inventor has been working with the concept for years. See "More Miles from a Barrel of Crude," *Popular Science*, page 74 Sept. 1979). Thus, the invention disclosed herein may actually include both mechanisms—plasma at some times and a flame front torch at other times. While the preferred mode of operation is clearly the one wherein the plasma is formed in the plasma-generating chamber 14, it is to be made clear that the structure of the invention is compatible with either mode of operation.

Figure 3:
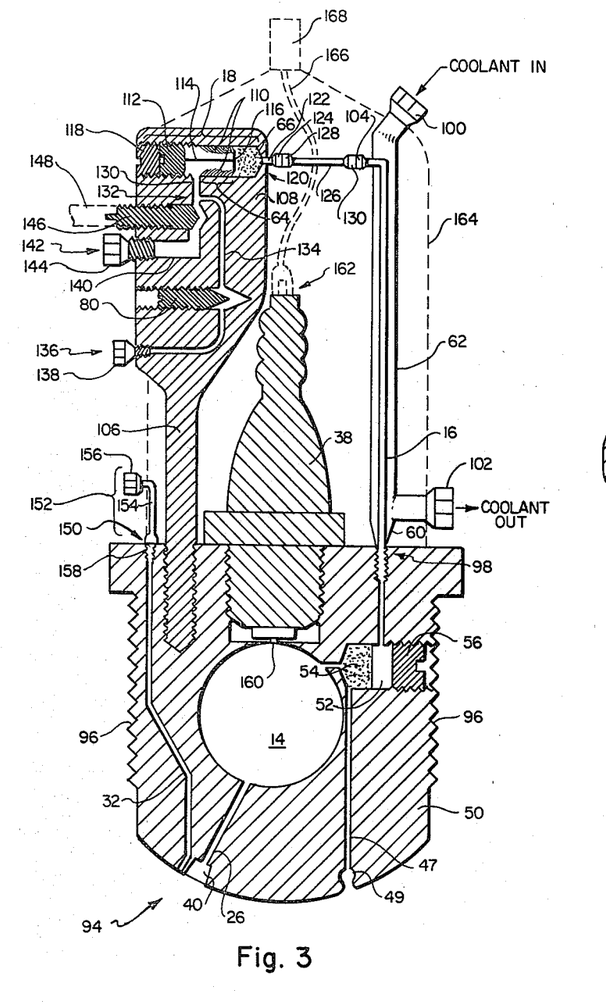
FIG. 3 is a sectional diagram of a fuel ignitor embodying the principles of the invention adapted to be removably inserted into a conventional spark plug or fuel injection opening of an internal combustion engine.

Referring now to FIG. 3, there is shown generally at 94 a sectional view of a plasma ignitor that embodies the principles of the present invention. This plasma ignitor 94 is configured to occupy about the same space or area as a conventional spark plug in a spark-ignition engine or a conventional fuel injection unit of a diesel engine. The base of the ignitor 94 comprises a plug 50 of the type described in connection with FIG. 2. That is, the plasma-generating chamber 14 is machined inside of the plug 50, typically being slightly offset from the center thereof. The plasma guide 26 and nozzle 40 exit along the lower side of the base 50. Threads 96 along the sides of the base 50 are compatible with matching threads in the spark plug or fuel injection opening within the engine block. The primary fuel line 32 passes through the base 50 so as to exit adjacent to and parallel with the plasma guide 26. Typically, the plasma guide 26 and the primary fuel line 32 are directed so as to point towards the exhaust valve of the cylinder into which the ignitor 94 is removably inserted.

Also included within the base 50 of the ignitor 94 are the transverse channel 52, including the porous plug 54 and end cap 56. The discharge unit 38 is also screwed into the base 50 so that its discharge point just protrudes into the plasma-generating chamber 14. The fuel line 16 is threadably inserted into the base 50 as shown generally at 98. Suitable stiffening material 60, such as stainless steel or copper, insures that a sound mechanical connection is made between the fuel line 16 and the base 50. Moreover, this stiffening material 60, as described in connection with FIG. 2, provides a good thermal bond between the fuel line 16 and the base 50, which base will be significantly elevated in temperature once the ignitor 94 is inserted into an operating engine.

A sampling tunnel 47 may also optionally be included with the base 50. This tunnel allows a sampled portion of the fuel/air mixture contained in the primary combustion chamber 28 to be fed back through the tip of the porous plug 54 into the plasma-generating chamber 14. This fed-back fuel/air mixture then serves as stabilizing feedback to help control the formation of plasma within the plasma-generating chamber. A specially shaped sampling tunnel orifice 49 is employed in connection with the sampling tunnel 47 to ensure that only a desired amount of lean fuel/air mixture is allowed to be fed-back into the plasma-generating chamber.

The coolant line or tube 62 is preferrably placed around the fuel line 16 in the manner shown in FIG. 3. That is, the fuel line 16 is inside of the coolant line 62 in coaxial fashion. Suitable couplings 100 and 102 allow the coolant line 62 to be attached to a suitable source of cycled collant, such as water. Typically, the size of the connector 100 may be ⅛ of an inch, while the size of the coupling 102 may be 3/16 inch, thereby allowing the coolant exiting from the ignitor 94 (which coolant has absorbed a significant amount of heat and thereby expanded to a certain degree) to freely exit therefrom. Both the fuel line 16 and the coolant line 62 may be readily realized using copper tubes. The fuel line 16, in the preferred embodiment, has an inside diameter of 0.030 inches. To facilitate assembly of ignitor 94, a coupling 104 is utilized at the point where the fuel line 16 exits from the inside of the coolant line 62. The combination of the coolant line 62, with the fuel line 16 therein, may therefore be fabricated as an integral unit that may be threadably inserted at 98 into the base 50.

A specially adapted mounting stud 106 may also be threadably inserted into the base 50 of the fuel ignitor 94. Integral with the mounting stud 106 is a specially adapted head unit 108 for mechanically housing the other elements associated with the ignitor 94. The backflow restrictor 18, for example, may conveniently be placed toward the upper end of the head unit 108. As described in connection with FIG. 2, this backflow restrictor comprises two portions: a first section 64 which is a one-way flow device and a second section 66 which is a porous material under pressure. The one-way flow device 64 may be simply realized using a section of copper tubing that has been burred or filed to have sloping or slanting fingers 110 lying in the desired direction of flow. These sloping or slanting fingers 110 provide less friction to the fluid flow in the desired direction than is present in the non-desired direction, thereby making it easier for the fluid to flow through the device in the desired direction.

The porous material in the second section 66 may be realized by inserting a piece of copper wool or cindered bronze in the end portion of the backflow restrictor 18. This porous piece of material may be placed under pressure by means of an end cap 112 having a narrow stem 114 extending therefrom. This stem 114 has a flat head 116 to effectively distribute the pressure along the whole front of the piece of porous material. The head 116 could either be small enough to allow fuel to flow therearound, or it could have small holes placed therein through which the fuel could flow. The end cap 112 could thereby be screwed down to the desired depth so as to impart a desired pressure upon the porous material in the section 66. A second end cap 118 could then be screwed on top of the first end cap 112 so as to firmly lock the two end caps in the desired location.

The fuel line would exit from the tip of the backflow restrictor 18 as shown generally at 120. This exit would include a short section line 122 to which a suitable coupling 124 is attached. A connecting section of fuel line 126, including suitable couplings 128 and 130, could then be used to connect the fuel line 16 to the fuel line 122 exiting from the backflow restrictor 18.

Entering into the side of the chamber wherein the backflow restrictor 18 is located is a short channel 130 through which the fuel may enter thereinto. This channel 130 separates at a junction shown generally at 132. A first branch 134 is routed through a multi-turn needle valve chamber 80 and exits at 136. A suitable coupling 138 may then be screwed into the exit point at 136 to allow the source of pressurized fuel to be connected thereto.

A second branch 140 leaving the channel junction at 132 is routed to an air inlet port at 142. A suitable coupling 144 may also be connected at the inlet 142 to conveniently allow a source of pressurized air to be connected thereto. A valve 146 allows the flow of air through the channel 140 to be controlled. As described in connection with FIG. 2, this valve may be automatically controlled, as a function of temperature. Accordingly, a suitable shaft coupling 148 could be connected to the valve 146 to allow the automatic control thereof. Of course, other types of automatic valve closing mechanisms could be used other than that shown.

The primary fuel line 32 which passes through the base unit 50 so as to exit in close proximity to and parallel with the discharge tunnel 26 enters the base 50 at 150. At this point, a suitable coupling line 152, which would include a short section of fuel line 154 having suitable couplings 156 and 158 attached to the ends thereof, may be used if necessary to facilitate the coupling of the primary fuel line thereto.

The discharge unit 38 is also threadably inserted into the base 50. This discharge unit 38 may be realized using a device similar to a conventional spark plug, having a discharge point 160 at the base thereof from which a suitable electric or electronic discharge may originate. Electrical connection is made to the discharge unit 38 at the top portion thereof as shown generally at 162. The energy discharged by the unit 38 must be sufficient to ionize, or "plasmatize," the vaporized gas contained in the plasma-generating chamber 14. The actual energy required will vary as a function of temperature. Accordingly, if a temperature sensor 90 (FIG. 2) is employed the input energy to the discharge unit 38 could be controlled so that no more energy than is necessary is used.

All of the elements that are secured to the base 50 of the ignitor 94 may be encapsuled in a suitable encapsuling material. This encapsuling material could be configured to a shape as outlined by the dotted line 164. The use of such an encapsuling material would thus protect all of the elements fastened to the base 50 and convert the ignitor 94 into an integral unit. When such an encapsuling material is used, a suitable electrical connector 166 would have to extend from the tip of the discharge unit 38, as shown at 162, to the exterior of the encapsuling material. A suitable connecting point 168 could then be inserted on top of the encapsuled device to allow easy electrical connection with the discharge unit 38.

Figure 4:
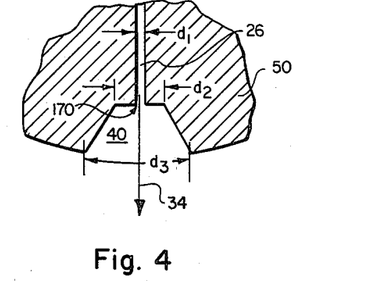
FIG. 4 is a sectional view showing the details of the nozzle placed at the end of the plasma guide.

FIG. 4 details a cross sectional view of the nozzle 40 used in connection with the plasma guide 26. For proper operation of the nozzle, it is important that there be a step increase in the orifice size as shown generally at 170. Thus, at 170, where the plasma guide 26 terminates, there is an abrupt right angle at which the nozzle 140 transversely expands to an orifice having a diameter $d_2$, the discharge tunnel having a diameter of $d_1$ where $d_1$ is significantly smaller than $d_2$. Typical values for $d_1$ and $d_2$ may be 0.1875 inches and 0.4375 inches respectively. After the nozzle 40 has expanded to diameter $d_2$, the walls of the plasma guide 40 continue to expand to an ultimate diameter of $d_3$ at the bottom surface of the base 50 (or at the interface between the outlet of the nozzle 40 and the primary combustion chamber 28). As can be seen, therefore, the nozzle 40 generally has a conical frustum-shaped configuration.

Figure 5A:
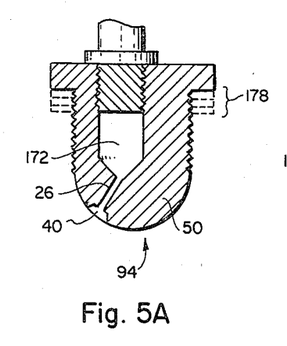
FIGS. 5A, 5B, and 5C depict alternative shapes that could be utilized for the plasma-generating chamber.
Figure 5B:
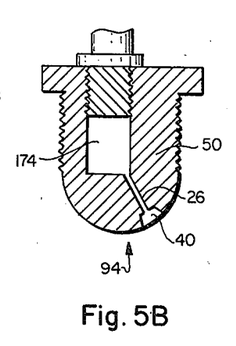
Figure 5C:
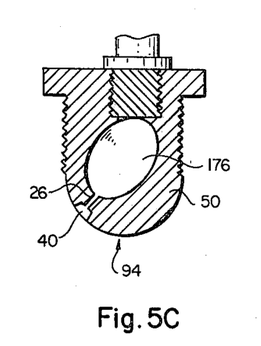

In FIGS. 5A through 5C, alternate configurations are shown for the shape of the plasma-generating chamber 14. While these alternate shapes are shown in connection with the base 50 of an ignitor 94, it is to be understood that they could also be employed in any embodiment, such as the more general applications depicted in FIGS. 1 and 2. In FIG. 5A, a plasma-generating chamber 172 is shown having a combination of cylinder and cone shape. This particular configuration is probably the easiest configuration to machine and produce. The plasma-generating chamber 174 of FIG. 5B is substantially cylindrical in shape, while that of FIG. 5C has an oval shape. The oval shaped chamber 176 of FIG. 5C, as well as the spherical shaped plasma-generating chamber 14 depicted in the prior figures, are probably the most difficult to produce and machine. However, the smooth interior walls of the spherical or oval chambers can be greatly advantageous for some applications in that the plasma that is formed therein may more easily assume a swirling or rotational motion. Such motion allows the plasma to be more completely formed as well as allowing a residual amount to remain behind to aid in the formation of new plasma at the next timed interval.

As mentioned previously, it is generally desirable that the plasma guide 26 be pointed towards the direction of the exhaust valve if the ignitor is used in a conventional internal combustion engine. The precise location of the nozzle can be optimally adjusted by use of washers of different thickness as shown generally at 178 in FIG. 5A. In practice, where an ignitor 94 of the type shown in FIG. 3 is employed as a retrofit device for a conventional internal combustion engine, each ignitor 94 will be specially designed for the particular engine for which it will be used. Nonetheless, through the use of spacing washers 178 it is also possible to adjust the nozzle significantly in order to achieve optimum combustion.

While the invention herein disclosed has been described by means of specific embodiments and applications thereof, numerous modifications and variations could be made thereto by those skilled in the art without departing from the spirit and scope thereof. It is therefore to be understood that within the scope of the appended claims, the invention may be practiced otherwise than as specifically described herein.

I claim:

1. A plasma ignitor for use with a primary combustion chamber having means for introducing a fuel/air mixture therein, said plasma ignitor comprising:
   a plasma-generating chamber;
   means for introducing a fuel into said plasma-generating chamber comprising:
      a source of pressurized fuel,
      a fuel line connecting said source of pressurized fuel with said plasma-generating chamber, and
      backflow restriction means interposed in said fuel line for opposing reverse flow action of said fuel therethrough and allowing said fuel to seep forwardly therethrough at a rate being generally proportional to the pressure imposed on said fuel;
   gas ionization means in contact with said plasma-generating chamber for converting said fuel within said plasma-generating chamber into a hot ionized gas at controlled time intervals; and
   discharge nozzle means for jetting said hot ionized gas into the primary combustion chamber, said hot ionized gas serving to ignite and efficiently burn said fuel/air mixture contained in said primary combustion chamber.

2. A plasma ignitor as defined in claim 1 wherein said discharge nozzle means comprises:
   a discharge tube tied between said plasma-generating chamber and primary combustion chamber; and
   a nozzle at the end of said discharge tube that is connected to the primary combustion chamber, said nozzle being adapted to cause said hot ionized gas flowing through said discharge tube to jet into the primary combustion chamber in a narrow stream and disperse therethroughout.

3. A plasma ignitor as defined in claim 2 wherein said nozzle comprises:
   a piece of conductive material having a first side thereof define a boundary of said primary combustion chamber, said conductive material having a conical frustum-shaped cavity therein that has a large base end positioned at the boundary of said primary combustion chamber defined by said first side of the conductive material and a smaller tip end recessed therein, said base end thereby opening up into said primary combustion chamber and said tip end lying in a first plane that is substantially parallel to said base end, said discharge tube being connected to said nozzle by passing into the frustum-shaped cavity at the center of said tip end at an angle that is orthogonal to said first plane, said tip end having a larger cross-sectional area than the cross-sectional area of said discharge tube.

4. A plasma ignitor as defined in claim 3 wherein said conductive material is maintained at a voltage potential by a voltage reference source, said voltage potential being selected so as to repell said hot ionized gas, thereby keeping said hot ionized gas from contacting the walls of said frustum-shaped cavity.

5. A plasma ignitor as defined in claim 3 wherein said means for introducing a fuel/air mixture in said primary combustion chamber comprises an inlet tube from a pressurized fuel/air source that directs said fuel/air mixture into said primary combustion chamber at an angle that is substantially parallel and adjacent to the narrow stream of hot ionized gas directed into the primary combustion chamber by said nozzle.

6. A plasma ignitor as defined in claim 1 further including vaporizing means interposed in said fuel line between said backflow restriction means and said plasma-generating chamber.

7. A plasma ignitor as defined in claim 6 further including vapor inhibiting means interposed in said fuel line upstream from said vaporizing means.

8. A plasma ignitor as defined in claim 7 wherein said means for introducing a fuel into said plasma-generating chamber further includes a source of pressurized air coupled to said fuel line upstream of said vapor inhibiting means for allowing controlled amounts of air to be mixed with said fuel prior to introducing the fuel into said plasma-generating chamber.

9. A plasma ignitor as defined in claim 4 wherein said piece of conductive material is a conductive plug adapted to be removably inserted into a conventional ignition source opening of a cylinder of an internal combustion engine, said cylinder serving as said primary combustion chamber.

10. A plasma ignitor as defined in claim 9 wherein said plasma-generating chamber and portions of said fuel introduction means are disposed inside of said conductive plug.

11. An igniting apparatus for a cylinder of an internal combustion engine, said cylinder having a first fuel/air mixture therein, said igniting apparatus comprising:
 an enclosed precombustion chamber removably mounted in the conventional spark-plug opening of a cylinder of the internal combustion engine;
 channeling means for providing fluid communication between said precombustion chamber and the cylinder, said channeling means comprising a discharge tube having a first end connected to said precombustion chamber and a second end connected to an inlet of a nozzle that has an outlet exiting into said cylinder;
 means for introducing a second fuel mixture into said precombustion chamber; and
 energizing means for energizing the second fuel mixture in said precombustion chamber at controlled time intervals, said second fuel mixture once energized exiting from said precombustion chamber via said discharge tube and nozzle and serving to ignite and efficiently burn the first fuel/air mixture contained in said cylinder.

12. An igniting apparatus as defined in claim 11 wherein said nozzle comprises a frustum-shaped chamber having front and back ends, said back end being of smaller cross-sectional area than said first end and of larger cross-sectional area than said discharge tube, the inlet of said nozzle entering said back end in the center thereof, the second end of said discharge tube being connected to said inlet at an angle that is orthogonal to said back end, said front end of the frustum-shaped chamber being opened and positioned so as to front said cylinder.

13. An igniting apparatus as defined in claim 12 wherein said means for introducing a second fuel into said precombustion chamber comprises:
 a fuel line connecting said pressurized fuel supply source with said precombustion chamber;
 backflow restriction means interposed in said fuel line for opposing reverse flow action of said second fuel therethrough and for allowing said second fuel to seep forwardly therethrough at a rate being generally proportional to the pressure imposed on said second fuel;
 vaporizing means for vaporizing said second fuel prior to its introduction into the precombustion chamber;
 a porous plug interposed in said fuel line downstream from said vaporizing means adapted to allow only vapors to pass therethrough; and
 vapor inhibiting means interposed in said fuel line upstream from said vaporizing means.

14. An igniting apparatus as defined in claim 13 wherein said means for introducing a second fuel into said precombustion chamber further includes a source of pressurized air coupled to said fuel line upstream of said vapor inhibiting means for allowing controlled amounts of air to be mixed with said second fuel prior to the vaporizing thereof.

15. An igniting apparatus as defined in claim 12 wherein said means for introducing a second fuel into said precombustion chamber comprises said channeling means, the first fuel/air mixture in said cylinder serving as said second fuel mixture, this fuel mixture entering said precombustion chamber by passing backwards through said nozzle and discharge tube during those time intervals when said fuel mixture is not energized by said energizing means.

16. An igniting apparatus as defined in claim 12 further including nozzle adjustment means for varying the orientation of the front end of said nozzle with respect to said cylinder.

17. A method for igniting a first fuel/air mixture in a primary combustion chamber through the use of a plasma-generating chamber in fluid communication with said primary combustion chamber, said method comprising the steps of:
 (a) injecting a vaporized fuel mixture into said plasma-generating chamber;
 (b) ionizing said vaporized fuel in said plasma-generating chamber to convert it into a hot plasma;
 (c) jetting said hot plasma from said plasma-generating chamber into said primary combustion chamber, and dispersing it there throughout, said hot plasma igniting said first fuel/air mixture contained therewithin and causing it to be efficiently burned without detonation.

18. A method as defined in claim 17 wherein said first fuel/air mixture has a ratio of air to fuel of at least thirty to one.

19. A method as defined in claim 18 wherein step (b) of ionizing said vaporized fuel comprises:
 elevating the temperature of said plasma-generating chamber; and
 discharging a high voltage in said plasma-generating chamber, said high voltage discharge in combination with said high temperature serving to ionize said vaporized fuel and convert it into a hot plasma.

20. A method as defined in claim 19 wherein step (c) of jetting said hot plasma into said primary combustion chamber comprises:
 exiting said hot plasma from said plasma-generating chamber through a narrow plasma guide having a conical frustum-shaped nozzle at the end thereof, the largest end of said frustum-shaped nozzle being open and serving as the output thereof, the smallest end of said frustum-shaped nozzle serving as the input thereof with said plasma guide being orthogonal to said smallest end and terminating at the center thereof; and
 electrically charging the walls of said plasma guide and frustum-shaped nozzle with an electrical charge that repells said hot plasma, thereby forcing said hot plasma to pass therethrough without coming in direct contact therewith.

* * * * *